(12) United States Patent
Tanaka et al.

(10) Patent No.: US 8,617,505 B2
(45) Date of Patent: Dec. 31, 2013

(54) METHOD OF PRODUCING SILICON CARBIDE

(71) Applicants: National Institute for Materials Science, Tsukuba (JP); Shin-ETSU Chemical Co., Ltd., Tokyo (JP)

(72) Inventors: Hidehiko Tanaka, Tsukuba (JP); Yoshitaka Aoki, Takasaki (JP)

(73) Assignee: National Institute for Materials Science, Tokyo (JP)

( * ) Notice: Subject to any disclaimer, the term of this patent is extended or adjusted under 35 U.S.C. 154(b) by 0 days.

(21) Appl. No.: 13/624,549

(22) Filed: Sep. 21, 2012

(65) Prior Publication Data

US 2013/0039832 A1    Feb. 14, 2013

Related U.S. Application Data

(62) Division of application No. 12/340,084, filed on Dec. 19, 2008.

(30) Foreign Application Priority Data

Dec. 27, 2007    (JP) .................................. 2007-338066

(51) Int. Cl.
    *C01B 31/36*    (2006.01)
(52) U.S. Cl.
    USPC ......................................................... 423/345
(58) Field of Classification Search
    None
    See application file for complete search history.

(56) References Cited

U.S. PATENT DOCUMENTS

| | | | |
|---|---|---|---|
| 5,283,019 A * | 2/1994 | Atwell et al. | 264/44 |
| 5,358,910 A | 10/1994 | Atwell et al. | |
| 6,639,025 B2 * | 10/2003 | Sakugawa | 525/476 |
| 6,761,673 B2 | 7/2004 | Shudo | |
| 7,662,473 B2 | 2/2010 | Aoki | |
| 2003/0104131 A1 | 6/2003 | Konno et al. | |
| 2004/0068047 A1 | 4/2004 | Chao | |
| 2006/0058486 A1 | 3/2006 | Lautenschlager | |
| 2006/0171873 A1 | 8/2006 | Inoue | |
| 2008/0053051 A1 | 3/2008 | Aoki | |
| 2008/0057816 A1 | 3/2008 | Aoki | |
| 2008/0057817 A1 | 3/2008 | Aoki | |
| 2008/0275173 A1 | 11/2008 | Aoki | |
| 2009/0069485 A1 | 3/2009 | Aoki | |

FOREIGN PATENT DOCUMENTS

| | | |
|---|---|---|
| EP | 0 361 736 A2 | 4/1990 |
| EP | 0 771 771 A2 | 5/1997 |
| JP | 5-270937 A | 10/1993 |
| JP | 7-10656 A | 1/1995 |

(Continued)

OTHER PUBLICATIONS

Notification of Grounds for Rejection for Japanese Patent Application No. 2007-338066, dated Aug. 27, 2012.

(Continued)

*Primary Examiner* — Melvin C Mayes
*Assistant Examiner* — Stefanie Cohen
(74) *Attorney, Agent, or Firm* — Birch, Stewart, Kolasch & Birch, LLP

(57) ABSTRACT

A method of producing silicon carbide is provided. The method includes heating a cured product of a curable silicone composition in a non-oxidizing atmosphere at a temperature exceeding 1,500° C. but not more than 2,600° C. The method is capable of producing high-purity silicon carbide simply and at a high degree of productivity, and is capable of simply producing a silicon carbide molded item having a desired shape and dimensions.

5 Claims, 1 Drawing Sheet

(56) References Cited

FOREIGN PATENT DOCUMENTS

| | | | |
|---|---|---|---|
| JP | 9-87028 | A | 3/1997 |
| JP | 11-171647 | A | 6/1999 |
| JP | 2003-171180 | A | 6/2003 |
| JP | 2004-51743 | A | 2/2004 |
| JP | 2006-256937 | A | 9/2006 |
| JP | 2008-201971 | A | 9/2006 |
| JP | 2008-81396 | A | 4/2008 |
| JP | 2008-81920 | A | 4/2008 |
| JP | 2008-81921 | A | 4/2008 |
| JP | 2009-67626 | A | 4/2009 |

OTHER PUBLICATIONS

European Office Action for Application No. 08254109.5 dated Oct. 24, 2011.

Extended European Search Report dated Aug. 10, 2009 for European Application No. 08254109.5.

Extended European Search Report for Application No. 12151818.7 dated Feb. 14, 2012.

First Office Action for Chinese Patent Application No. 200810107480.6, dated May 3, 2012.

Japanese Office Action for Application No. 2007-338066 dated Mar. 13, 2012 (with English translation).

Theresa Gumula et al., "Structural characterization of polysiloxane-derived phases produced during heat treatment." Journal of Molecular Structure, vol. 704, No. 1-3, pp. 259-262, 2004.

The Notification of Grounds for Rejection (including English translation), dated Jul. 30, 2013, issued in corresponding Japanese Patent Application No. 2012-234665.

* cited by examiner

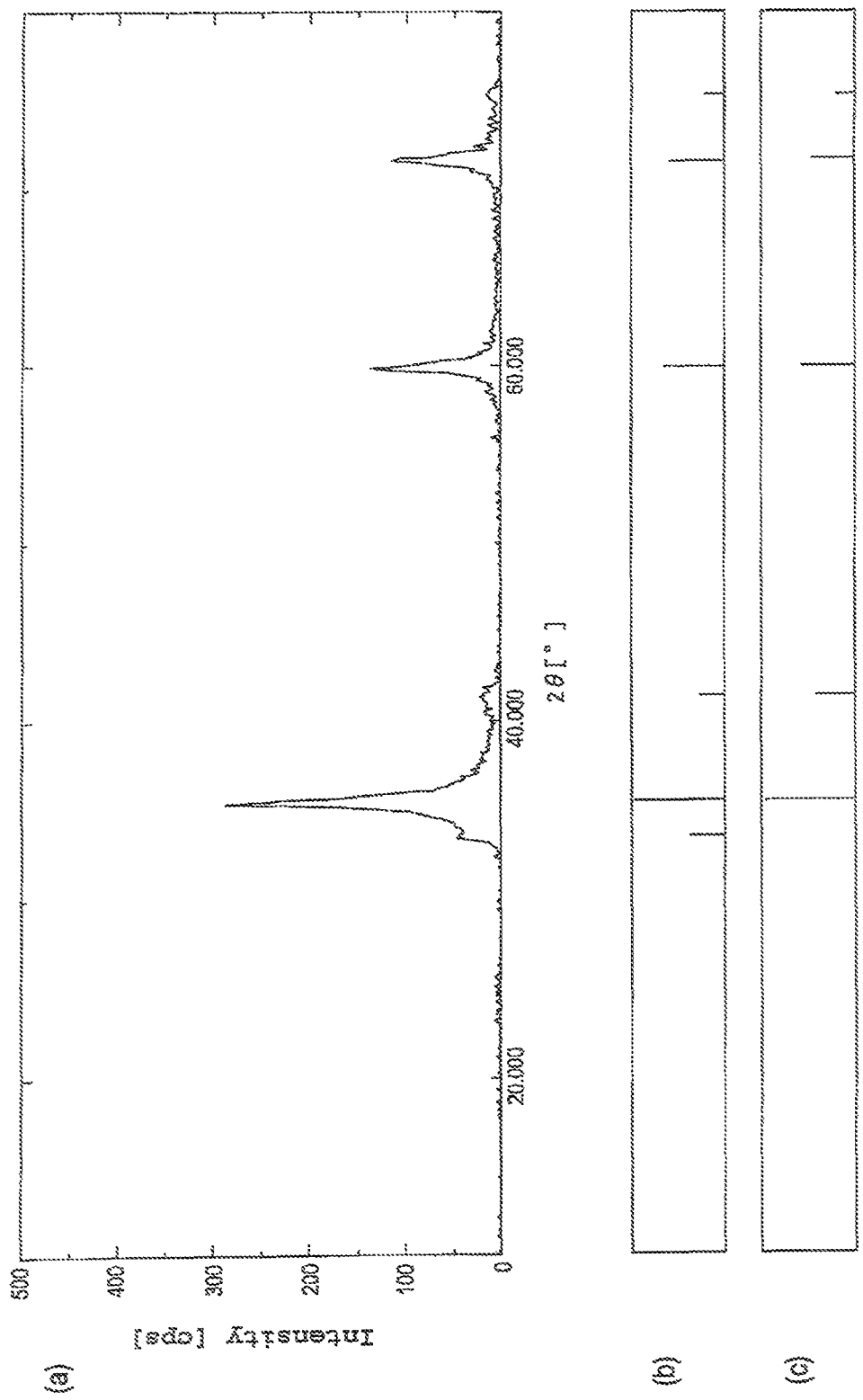

METHOD OF PRODUCING SILICON CARBIDE

This application is a Divisional of co-pending application Ser. No. 12/340,084, filed on Dec. 19, 2008 for which priority is claimed under 35 U.S.C. §120 and under 35 U.S.C. §119(a) to Patent Application No. 2007-338066 filed in Japan, file Dec. 27, 2007. The entire contents of all of the above applications are hereby incorporated by reference.

BACKGROUND OF THE INVENTION

1. Field of the Invention

The present invention relates to a method of producing silicon carbide that is capable of producing high-purity silicon carbide simply and at a high degree of productivity using a silicone composition.

2. Description of the Prior Art

Silicon carbide ceramics are chemically stable at both normal temperatures and high temperatures, and exhibit excellent mechanical strength at high temperature, and are therefore widely used as high-temperature materials. In recent years, in the field of semiconductor production, high-purity silicon carbide ceramic sintered bodies, which exhibit excellent heat resistance and creep resistance, have started to be used as boards and process tubes and the like within steps for conducting wafer heat treatments or the thermal diffusion of trace elements. If the silicon carbide material used in these steps comprises impurity elements, then these impurity elements may become incorporated within the wafer during heating of the wafer, causing contamination of the wafer. Accordingly, the silicon carbide material used in these applications should preferably have as high a degree of purity as possible.

Known methods of producing silicon carbide powder include the Acheson process, silica reduction methods, and vapor phase reaction methods. However, silicon carbide produced using the Acheson process tends to suffer from low purity, silica reduction methods suffer from problems of uniformity resulting from heterogeneous mixing of the silica powder and the silicon carbide powder, and vapor phase methods suffer from problems of low productivity. Recently, a method that uses a silicon metal alloy as the starting raw material has been reported (see Patent Document 1), and although this method enables silicon carbide to be obtained at low temperatures, the steps are complex, including conducting reaction under high pressure. Further, methods of generating carbon-silicon bonds by mixing an ethyl silicate containing no carbon-silicon bonds with an organic compound, and then heating and reacting the mixture have also been reported (see Patent Documents 2 and 3), but the large quantity of decomposition products generated means it is difficult to claim that these methods offer a high degree of productivity.

Furthermore, because silicon carbide is usually resistant to sintering, conventionally, obtaining a silicon carbide molded item having a desired shape and dimensions is far from simple.

[Patent Document 1] US 2006/0171873 A1
[Patent Document 2] JP 11-171647 A
[Patent Document 3] JP 2006-256937 A

SUMMARY OF THE INVENTION

An object of the present invention is to address the problems associated with the conventional technology described above, and provide a production method that is capable of producing high-purity silicon carbide simply and at a high degree of productivity. Furthermore, another object of the present invention is to provide a production method that is capable of simply producing a silicon carbide molded item having a desired shape and dimensions.

As a result of intensive investigation aimed at addressing the problems described above, the inventors of the present invention discovered that the above objects could be achieved by a mineralization of a silicone cured product, and they were therefore able to complete the present invention.

In other words, the present invention provides a method of producing silicon carbide, comprising heating a cured product of a curable silicone composition in a non-oxidizing atmosphere at a temperature exceeding 1,500° C. but not more than 2,600° C.

According to the production method of the present invention, because the starting raw material is a silicone composition, purification can be performed at the silicone composition stage, and by then simply thermally decomposing the silicone composition, a high-purity silicon carbide molded item can be produced simply and at a high degree of productivity.

Furthermore, according to the production method of the present invention, by first preparing a silicone molded item having a desired shape and dimensions, and then simply heating (namely, calcining) the molded item, a silicon carbide having a desired shape and dimensions can be produced with comparative ease.

BRIEF DESCRIPTION OF THE DRAWINGS

FIG. 1 is a diagram showing the X-ray diffraction spectrum (a) and the peak data thereof (b) for a yellow-green solid obtained in Example 1, together with the X-ray diffraction spectrum peak data for β-silicon carbide crystals (c) (wherein, the vertical axes in the peak data graphs are logarithmic).

DETAILED DESCRIPTION OF THE PREFERRED EMBODIMENTS

A more detailed description of the present invention is presented below. In this description, "room temperature" refers to the ambient temperature, which can typically change within a range from 10 to 35° C.

—Curable Silicone Composition—

There are no particular restrictions on the curing mechanism for the curable silicone composition used as the starting material in the method of the present invention, and curable silicone compositions of any curing type can be used. Examples include addition-curable, ultraviolet-curable, electron beam-curable and condensation-curable silicone compositions.

The cured product of the curable silicone composition can be obtained by using a conventional method to cure the composition in accordance with the curing mechanism of the composition. In those cases where a silicon carbide molded item of a desired shape and dimensions is required, the composition is preferably first molded into the desired shape having the desired dimensions, and is then cured to obtain the cured product.

In those cases where the curable silicone composition needs to be molded, the molding method employed can be selected from amongst cast molding, injection molding and extrusion molding methods and the like, in accordance with whether the composition is solid or liquid at room temperature. In the case of cast molding, the composition should be liquid at room temperature, and more specifically, preferably has a viscosity at room temperature within a range from 1 to 1,000,000 mPa·s, and even more preferably from 10 to 300,000 mPa·s.

In those cases where the curable silicone composition is molded, a silicon carbide powder may be added to the composition as an optional component to increase the strength of the resulting molded item. There are no particular restrictions on the particle shape of the added silicon carbide powder, but the volume average particle size of the silicon carbide powder is preferably within a range from 0.01 to 10 µm, and is even more preferably from 0.02 to 1 µm. In this description, the "volume average particle size" refers to a value measured using a laser diffraction and scattering particle size analyzer LA-920 (a product name, manufactured by Horiba, Ltd.), and represents the volume average particle size corresponding with 50% in a cumulative distribution. A single silicon carbide powder may be used, or two or more silicon carbide powders that differ in terms of their volume average particle sizes or the like may be used in combination. Although there are no particular restrictions on the silicon carbide powder, high-purity powders are preferred, and for example, a powder obtained by using a conventional method to pulverize a silicon carbide obtained using the production method of the present invention may be used. If a silicon carbide powder is added to the curable silicone composition, then the quantity added of the powder is preferably sufficient that the ratio at room temperature of the silicon carbide powder relative to the entire curable silicone composition is within a range from 25 to 80% by volume, and more preferably from 35 to 70% by volume.

As mentioned above, there are no particular restrictions on the curable silicone composition, but of the various possible types of composition, addition-curable silicone compositions and condensation-curable silicone compositions are preferred. These compositions are described below.

<Addition-Curable Silicone Composition>

The addition-curable silicone composition comprises, for example, (a) an organopolysiloxane having at least two alkenyl groups bonded to silicon atoms, (b) an organohydrogenpolysiloxane having hydrogen atoms bonded to silicon atoms, in which the molar ratio of the hydrogen atoms relative to all the silicon atoms within a molecule is within a range from 0.2 to 2.0, and (c) a platinum group metal-based catalyst.

—Component (a): Alkenyl Group-Containing Organopolysiloxane

The organopolysiloxane of the component (a) is the base polymer of the addition-curable silicone composition, and contains at least two alkenyl groups bonded to silicon atoms. The component (a) may use either a single organopolysiloxane, or a combination of two or more different organopolysiloxanes. Conventional organopolysiloxanes may be used as the component (a). The weight average molecular weight of the organopolysiloxane of the component (a), measured by gel permeation chromatography (hereafter abbreviated as "GPC") and referenced against polystyrene standards, is preferably within a range from approximately 300 to 10,000. Moreover, the viscosity at 25° C. of the organopolysiloxane of the component (a) is preferably within a range from 1 to 10,000 mPa·s, and is more preferably from approximately 10 to 3,000 mPa·s. Provided the viscosity is within this range, the handling properties of the component (a) are favorable, and in those cases where a silicon carbide powder is added to the composition, the composition can be readily mixed with the silicon carbide powder. From the viewpoint of availability of the raw materials, the organopolysiloxane of the component (a) is basically either a straight-chain structure containing no branching in which the molecular chain (the main chain) is composed of repeating diorganosiloxane units ($R^1_2SiO_{2/2}$ units) and both molecular chain terminals are blocked with triorganosiloxy groups ($R^1_3SiO_{1/2}$ units), or a cyclic structure containing no branching in which the molecular chain is composed of repeating diorganosiloxane units, although the structure may also partially include branched structures such as trifunctional siloxane units ($R^1SiO_{3/2}$ units) or $SiO_{4/2}$ units. (In the above formulas, $R^1$ represents identical or different, unsubstituted or substituted monovalent hydrocarbon groups, preferably containing from 1 to 10 carbon atoms, and even more preferably 1 to 8 carbon atoms.)

Examples of the component (a) include organopolysiloxanes containing at least two alkenyl groups bonded to silicon atoms, represented by an average composition formula (1) shown below:

$$R^1_a SiO_{(4-a)/2} \quad (1)$$

(wherein, $R^1$ is as defined above, and a is a number that is preferably within a range from 1.5 to 2.8, more preferably from 1.8 to 2.5, and most preferably from 1.95 to 2.05).

Examples of the monovalent hydrocarbon group represented by $R^1$ include alkyl groups such as a methyl group, ethyl group, propyl group, isopropyl group, butyl group, isobutyl group, tert-butyl group, pentyl group, neopentyl group, hexyl group, octyl group, nonyl group or decyl group; aryl groups such as a phenyl group, tolyl group, xylyl group or naphthyl group; cycloalkyl groups such as a cyclopentyl group or cyclohexyl group; alkenyl groups such as a vinyl group, allyl group, propenyl group, isopropenyl group, butenyl group, hexenyl group or octenyl group; cycloalkenyl groups such as a cyclohexenyl group; and groups in which a portion of, or all of, the hydrogen atoms within one of the above hydrocarbon groups have been substituted with a halogen atom such as a fluorine atom, bromine atom or chlorine atom, or with a cyano group or the like, such as a chloromethyl group, chloropropyl group, bromoethyl group, trifluoropropyl group or cyanoethyl group.

In the average composition formula (1), at least two of the $R^1$ groups are alkenyl groups (and preferably alkenyl groups of 2 to 8 carbon atoms, and even more preferably 2 to 6 carbon atoms). In those cases where the organopolysiloxane of the component (a) has a straight-chain structure, the alkenyl groups may be bonded solely to silicon atoms at the molecular chain terminals, solely to silicon atoms at non-terminal positions within the molecular chain, or may also be bonded to both these types of silicon atoms. In terms of achieving a favorable curing rate for the composition and superior physical properties for the cured product, at least one alkenyl group is preferably bonded to a silicon atom at a molecular chain terminal.

Basically, the $R^1$ groups may be any of the groups listed above, although the alkenyl groups are preferably vinyl groups, and the monovalent hydrocarbon groups other than the alkenyl groups are preferably methyl groups or phenyl groups.

Specific examples of the component (a) include compounds represented by the general formulas shown below.

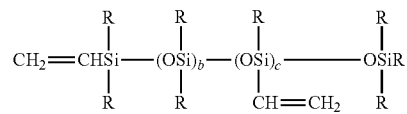

-continued

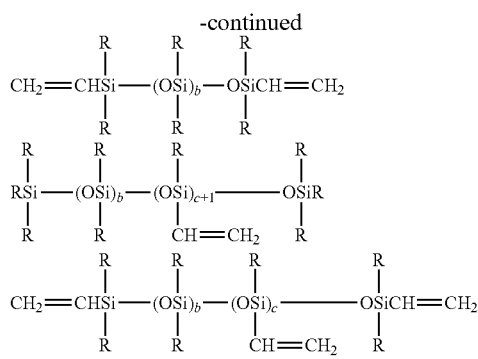

In the above general formulas, R has the same meaning as $R^1$ with the exception of not including alkenyl groups. b and c are integers that satisfy b≥0 and c≥1 respectively, provided that b+c is a number that yields a weight average molecular weight and a viscosity for the organopolysiloxane that fall within the ranges specified above (namely, from 300 to 10,000, and from 1 to 10,000 mPa·s, preferably from approximately 10 to 3,000 mPa·s).

—Component (b): Organohydrogenpolysiloxane

The organohydrogenpolysiloxane of the component (b) comprises sufficient silicon atom-bonded hydrogen atoms (namely, SiH groups) that the molar ratio of SiH groups relative to the total number of silicon atoms within the molecule is within a range from 0.2 to 2.0, is preferably at least 0.2 and less than 2.0, is more preferably within a range from 0.5 to 1.5, and is most preferably from 0.7 to 1.0. If this molar ratio is less than 0.2, then the mechanical strength following calcination of the composition under a non-oxidizing atmosphere tends to be inferior, whereas if the molar ratio exceeds 2.0, then production of the organohydrogenpolysiloxane becomes difficult, the versatility diminishes, and the composition becomes economically unviable. The component (b) reacts with the component (a) and functions as a cross-linking agent. The component (b) may use either a single organohydrogenpolysiloxane, or a combination of two or more different organohydrogenpolysiloxanes.

There are no particular restrictions on the molecular structure of the component (b), and conventionally produced chain-like, cyclic, branched, or three dimensional network (resin-like) organohydrogenpolysiloxanes can be used. If the component (b) has a chain-like structure, then the SiH groups may be bonded solely to silicon atoms at the molecular chain terminals, solely to silicon atoms at non-terminal positions within the molecular chain, or may also be bonded to both these types of silicon atoms. Furthermore, the number of silicon atoms within a single molecule (namely, the polymerization degree) is typically within a range from 2 to 300 and is preferably from 4 to 150. An organohydrogenpolysiloxane that is liquid at room temperature is particularly favorable as the component (b).

Examples of the component (b) include organohydrogenpolysiloxanes represented by an average composition formula (2) shown below.

$$R^2{}_d H_e SiO_{(4-d-e)/2} \quad (2)$$

(wherein, $R^2$ represents identical or different, unsubstituted or substituted monovalent hydrocarbon groups, preferably containing from 1 to 10 carbon atoms, and even more preferably from 1 to 8 carbon atoms, d and e represent numbers that preferably satisfy 0.7≤d≤2.1, 0.001≤e≤1.0 and 0.8≤d+e≤3.0, and even more preferably satisfy 1.0≤d≤2.0, 0.01≤e≤1.0 and 1.5≤d+e≤2.5)

Examples of $R^2$ include the same groups as those listed above for $R^1$ within the above average composition formula (1) (but excluding alkenyl groups).

Specific examples of organohydrogenpolysiloxanes represented by the above average composition formula (2) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of methylhydrogensiloxane and dimethylsiloxane with both terminals blocked with trimethylsiloxy groups, dimethylpolysiloxane with both terminals blocked with dimethylhydrogensiloxy groups, copolymers of methylhydrogensiloxane and dimethylsiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, methylphenylsiloxane and dimethylsiloxane with both terminals blocked with trimethylsiloxy groups, copolymers of methylhydrogensiloxane, diphenylsiloxane and dimethylsiloxane with both terminals blocked with dimethylhydrogensiloxy groups, copolymers of methylhydrogensiloxane, methylphenylsiloxane and dimethylsiloxane with both terminals blocked with dimethylhydrogensiloxy groups, copolymers composed of $(CH_3)_2HSiO_{1/2}$ units, $(CH_3)_2SiO_{2/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units, and $(C_6H_5)_3SiO_{1/2}$ units.

The quantity added of the component (b) must be sufficient that the quantity of SiH groups within this component (b), per 1.0 mols of silicon atom-bonded alkenyl groups within the component (a), is within a range from 0.1 to 5.0 mols, preferably from 0.5 to 3.0 mols, and even more preferably from 0.8 to 2.0 mols. Provided the quantity added of the component (b) yields a quantity of SiH groups within the above range, the curing of the curable silicone composition is more likely to proceed satisfactorily.

—Component (c): Platinum Group Metal-Based Catalyst

The platinum group metal-based catalyst of the component (c) is used as a catalyst for accelerating the addition curing reaction (the hydrosilylation reaction) between the component (a) and the component (b). The component (c) may use either a single catalyst, or a combination of two or more different catalysts. Conventional platinum group metal-based catalysts can be used as the component (c), although the use of platinum or a platinum compound is preferred. Specific examples of the component (c) include platinum black, platinic chloride, chloroplatinic acid, alcohol-modified products of chloroplatinic acid, complexes of chloroplatinic acid with olefins, aldehydes, vinylsiloxanes or acetylene alcohols, and complexes of platinum and vinylsiloxanes. Other conventional platinum group metal-based catalysts that are used for addition curing reactions (hydrosilylation reactions) can also be used.

The quantity added of the component (c) need only be an effective catalytic quantity, may be suitably increased or decreased in accordance with the desired curing rate, and preferably yields an equivalent mass of the platinum group metal relative to the mass of the component (a) that is within a range from 0.1 to 1,000 ppm, and even more preferably from 1 to 200 ppm.

—Composition Preparation

The addition-curable silicone composition can be prepared by mixing the components (a) to (c) using a conventional method. From the viewpoints of the molding and handling properties of the composition, the viscosity of the composition at room temperature is preferably within a range from 10 to 200,000 mPa·s, and even more preferably from 50 to 100,000 mPa·s.

—Composition Curing

Curing of the addition-curable silicone composition can be conducted using conventional methods. In other words, curing is typically performed either by leaving the composition to stand at room temperature for a long period, or by subjecting the composition to heating, thereby causing a hydrosilylation reaction to proceed within the composition.

Because the curing rate varies depending on the makeup of the composition, conditions such as the heating temperature may be selected appropriately in accordance with the blend quantities of the respective components. The heating temperature is typically within a range from room temperature to 300° C., and a temperature within a range from 50 to 200° C. is often satisfactory. The curing time may be set as desired within a range from 1 minute to 3 hours, and is preferably from 3 minutes to 2 hours. Furthermore, secondary curing may be conducted if required, and if conducted, the temperature conditions for the secondary curing are typically 120° C. or higher, and are frequently within a range from 150 to 250° C. The secondary curing time is typically within a range from 10 minutes to 48 hours, and a time of 30 minutes to 24 hours is often satisfactory.

<Condensation-Curable Silicone Composition>

The condensation-curable silicone composition comprises, for example, (α) a silicone resin represented by an average composition formula (3) shown below:

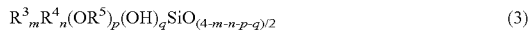

$$R^3{}_m R^4{}_n (OR^5)_p (OH)_q SiO_{(4-m-n-p-q)/2} \quad (3)$$

(wherein, each $R^3$ represents, independently, a hydrogen atom or a monovalent hydrocarbon group other than an aryl group that either contains or does not contain a carbonyl group, $R^4$ represents a phenyl group, $R^5$ represents a monovalent hydrocarbon group of 1 to 4 carbon atoms, m represents a number that satisfies: $0.1 \leq m \leq 2$, n represents a number that satisfies: $0 \leq n \leq 2$, p represents a number that satisfies: $0 \leq p \leq 1.5$, and q represents a number that satisfies: $0 \leq q \leq 0.35$, provided that a value of m+n+p+q satisfies: $0.1 \leq m+n+p+q \leq 2.6$), (β) a hydrolyzable silane or a partial hydrolysis-condensation product thereof or a combination thereof as an optional component, and (γ) a condensation reaction catalyst as an optional component.

—Component (α): Silicone Resin

The silicone resin used as the component (α) is a silicone resin represented by the above average composition formula (3). Here, the term "silicone resin" refers to an organopolysiloxane that adopts a three dimensional structure as a result of containing T units (trifunctional siloxane units) and/or Q units (tetrafunctional siloxane units). In some cases, the silicone resin may also include M units (monofunctional siloxane units) and/or D units (difunctional siloxane units).

The silicone resin used as the component (α) is preferably a solid, at least at temperatures of room temperature or lower, and particularly at temperatures of 25° C. or lower, and has a softening point that is preferably 40° C. or higher, and even more preferably within a range from 40 to 100° C.

Next is a description of the above average composition formula (3) that represents the component (α).

In the formula (3), each of the $R^3$ groups preferably represents, independently, either a hydrogen atom, or a monovalent hydrocarbon group other than an aryl group that contains from 1 to 8 carbon atoms and either contains or does not contain a carbonyl group. Specific examples of $R^3$ include a hydrogen atom; alkyl groups such as a methyl group, ethyl group, propyl group, butyl group, pentyl group or hexyl group; cycloalkyl groups such as a cyclopentyl group or cyclohexyl group; alkenyl groups such as a vinyl group, allyl group, propenyl group, isopropenyl group or butenyl group; and acyl groups such as an acryloyl group or methacryloyl group. From the viewpoint of ease of availability of the raw materials, $R^3$ is preferably a hydrogen atom, or a methyl group, ethyl group or vinyl group. In those cases where $R^3$ is a hydrogen atom, the reactive SiH groups that exist within the silicone resin improve the reactivity with the oxide coating (silica) that typically covers the surface of the silicon carbide powder that may be added to the condensation-curable silicone composition as an optional component.

The aforementioned m is a number that satisfies: $0.1 \leq m \leq 2$, the upper limit for m is preferably 1.5 or lower, and the lower limit for m is preferably at least 0.1, and even more preferably 0.5 or higher. Provided the value of m falls within this range, the fluidity of the silicone resin is more readily reduced, meaning a uniform mixture with the optional silicon carbide powder can be achieved more readily at a comparatively low temperature. Furthermore, because any reduction in the mass of the mineralized product obtained by conducting a heat treatment following the curing can be more readily suppressed, resources can be better conserved, which is also economically more advantageous.

The aforementioned $R^4$ group is a phenyl group, and in those cases where a silicon carbide powder is added to the condensation-curable silicone composition, is useful in improving the wettability relative to the silicon carbide powder.

The aforementioned n is a number that satisfies: $0 \leq n \leq 2$, the upper limit for n is preferably 1.5 or lower, and the lower limit for n is preferably at least 0.05, and even more preferably 0.1 or higher. Provided the value of n falls within this range, the phenyl group content is not too high, and because any reduction in the mass of the mineralized product obtained by conducting a heat treatment following curing can be more readily suppressed, resources can be better conserved, which is also economically more advantageous.

Specific examples of $R^5$ include alkyl groups of 1 to 4 carbon atoms such as a methyl group, ethyl group, propyl group, isopropyl group, butyl group or isobutyl group, and a methyl group is particularly preferred industrially. If the number of carbon atoms within $R^5$ exceeds 4, then the reactivity of the group represented by $OR^5$ becomes overly poor, which may result in deformation in the shape of the mineralized product during the heat treatment conducted following curing.

The aforementioned p is a number that satisfies: $0 \leq p \leq 1.5$, the upper limit for p is preferably 1.2 or lower, and the lower limit for p is preferably at least 0.05 and even more preferably 0.1 or higher. Provided the value of p falls within this range, the quantity within the silicone resin of the group represented by $OR^5$ is not too high, and the molecular weight of the silicone resin can be maintained at a high value, meaning any loss of carbon or silicon from the material as a result of elimination and gasification during the heat treatment conducted following curing can be suppressed to low levels.

The aforementioned q is a number that satisfies: $0 \leq q \leq 0.35$, and is preferably a number that satisfies: $0 \leq q \leq 0.3$, and is most preferably 0. The value of q represents the small quantity of residual silanol groups that may be retained within the silicone resin during production. Provided the value of q falls within the above range, the reactivity of the silanol groups can be suppressed for the silicone resin as a whole, and both the storage stability and workability of the silicone resin can be more readily improved.

The value of m+n+p+q is a number that satisfies: $0.1 \leq m+n+p+q \leq 2.6$. A value of m+n+p+q within this range has the effect of enabling more ready suppression of any loss of carbon or silicon from the material as a result of elimination and gasification during the heat treatment conducted following curing.

There are no particular restrictions on the molecular weight of the silicone resin, provided it is sufficient to enable ready suppression of any loss of carbon or silicon from the material as a result of elimination and gasification during the heat treatment conducted following curing. For example, the weight average molecular weight of the silicone resin, measured by GPC and referenced against polystyrene standards, is preferably at least 600, and is even more preferably within a range from 1,000 to 10,000.

There are no particular restrictions on the silicone resin provided it satisfies the conditions described above. The silicone resin of the component (a) may be either a single resin, or a combination of two or more resins with different molecular structures or different proportions of the various siloxane units.

These types of silicone resins can be produced by conventional methods. For example, the target silicone resin can be produced by conducting a cohydrolysis, if required in the presence of an alcohol of 1 to 4 carbon atoms, of the organochlorosilanes that correspond with the siloxane units incorporated within the structure of the target resin, using a ratio between the organochlorosilanes that reflects the ratio between the corresponding siloxane units, while removing the by-product hydrochloric acid and low boiling point components. Furthermore, in those cases where alkoxysilanes, silicone oils or cyclic siloxanes are used as starting raw materials, the target silicone resin can be obtained by using an acid catalyst such as hydrochloric acid, sulfuric acid or methanesulfonic acid, adding water to effect the hydrolysis if required, and following completion of the polymerization reaction, removing the acid catalyst and low boiling point components.

—Component (β): Hydrolyzable Silane or Partial Hydrolysis-Condensation Product Thereof or Combination Thereof The hydrolyzable silane or partial hydrolysis-condensation product thereof or combination thereof that functions as the component (β) acts as a curing agent, but is an optional component that need not necessarily be used. The component (β) may use either a single material or a combination of two or more different materials. Examples of compounds that can be used favorably as the component (β) include silanes containing at least three silicon atom-bonded hydrolyzable groups within each molecule, partial hydrolysis-condensation products thereof (namely, organopolysiloxanes in which at least one, and preferably two or more, of the hydrolyzable groups remain within the molecule), and combinations thereof. In this description, the term "hydrolyzable group" describes a group that can generate a hydroxyl group upon hydrolysis under the action of water.

Examples of compounds that can be used favorably as the above hydrolyzable silane include compounds represented by a formula (4) shown below:

$$R^6_f SiX_{4-f} \qquad (4)$$

(wherein, $R^6$ represents an unsubstituted or substituted monovalent hydrocarbon group, X represents a hydrolyzable group, and f represents either 0 or 1).

Preferred examples of $R^6$ include alkyl groups such as a methyl group or ethyl group; alkenyl groups such as a vinyl group, allyl group or propenyl group; and aryl groups such as a phenyl group. Examples of X include acyloxy groups such as an acetoxy group, octanoyloxy group or benzoyloxy group; ketoxime groups (namely, iminoxy groups) such as a dimethyl ketoxime group, methyl ethyl ketoxime group or diethyl ketoxime group; alkoxy groups such as a methoxy group, ethoxy group or propoxy group; alkoxyalkoxy groups such as a methoxyethoxy group, ethoxyethoxy group or methoxypropoxy group; alkenyloxy groups such as a vinyloxy group, isopropenyloxy group or 1-ethyl-2-methylvinyloxy group; amino groups such as a dimethylamino group, diethylamino group, butylamino group or cyclohexylamino group; aminoxy groups such as a dimethylaminoxy group or diethylaminoxy group; and amide groups such as an N-methylacetamide group, N-ethylacetamide group or N-methylbenzamide group.

Specific examples of the component (β) include hydrolyzable silanes such as methyltriethoxysilane, vinyltriethoxysilane, vinyltriacetoxysilane and ethyl orthosilicate; and partial hydrolysis-condensation products of these compounds.

In those cases where a hydrolyzable silane, a partial hydrolysis-condensation product thereof, or a combination thereof is used as the component (β), the quantity added is preferably within a range from 0.01 to 20 parts by mass, and even more preferably from 0.1 to 10 parts by mass, per 100 parts by mass of the silicone resin of the component (α). In those cases where the component (β) is used, using a quantity within the above range ensures that the storage stability, adhesion and curing rate of the composition of the present invention are particularly favorable.

—Component (γ): Condensation Reaction Catalyst

The condensation reaction catalyst of the component (γ) is an optional component, and need not necessarily be added. In those cases where the above hydrolyzable silane or partial hydrolysis-condensation product thereof or combination thereof of the component (β) contains aminoxy groups, amino groups or ketoxime groups or the like, the component (γ) need not be used. The component (γ) may use either a single catalyst or a combination of two or more different catalysts. Examples of the condensation reaction catalyst of the component (γ) include organotitanate esters such as tetrabutyl titanate and tetraisopropyl titanate; organotitanium chelate compounds such as diisopropoxybis(acetylacetonato)titanium and diisopropoxybis(ethylacetoacetate)titanium; organoaluminum compounds such as aluminum tris(acetylacetonate) and aluminum tris(ethylacetoacetate); organozirconium compounds such as zirconium tetra(acetylacetonate) and zirconium tetrabutyrate; organotin compounds such as dibutyltin dioctoate, dibutyltin dilaurate and dibutyltin di(2-ethylhexanoate); metal salts of organic carboxylic acids such as tin naphthenate, tin oleate, tin butyrate, cobalt naphthenate and zinc stearate; amine compounds or the salts thereof such as hexylamine and dodecylamine phosphate; quaternary ammonium salts such as benzyltriethylammonium acetate; lower aliphatic acid salts of alkali metals such as potassium acetate; dialkylhydroxylamines such as dimethylhydroxylamine and diethylhydroxylamine; and guanidyl group-containing organosilicon compounds.

In those cases where a condensation reaction catalyst of the component (γ) is used, although there are no particular restrictions on the quantity added, the quantity is preferably within a range from 0.01 to 20 parts by mass, and even more preferably from 0.1 to 10 parts by mass, per 100 parts by mass of the component (α). If the component (γ) is used, then provided the quantity falls within the above range, the curability and storage stability of the composition of the present invention are particularly favorable.

In the condensation-curable silicone composition described above, the quantities of the component (β) and the component (γ) are preferably kept as small as possible, and compositions that do not use these components are particularly desirable. In other words, preferred condensation-curable silicone compositions are composed essentially of only the component (α), or only the component (α) and a silicon carbide powder, as such compositions exhibit more favorable retention of the shape and dimensions of the molded item over the course of the heat treatment. Here the expression "composed essentially of only the component (α), or only the component (α) and a silicon carbide powder" means that the incorporation of very small quantities of unavoidable other components is permissible, but incorporation of significant quantities of these other components is excluded.

—Composition Preparation

In those case where the condensation-curable silicone composition comprises the component (β), the component (γ) and/or a silicon carbide powder, the composition can be prepared by mixing the component (β), the component (γ) and/or the silicon carbide powder with the component (α), which may be in a solventless state, namely those cases where the component (α) is a liquid at room temperature, a liquid state formed by heating and melting the solid component (α), a water-based emulsion state obtained by emulsifying the component (α) in water, or an organic solvent solution state obtained by dissolving the component (α) in an organic solvent such as toluene or tetrahydrofuran.

In those cases where the component (α) is a liquid at room temperature, and is simply mixed with the other components in a solventless state, the viscosity of the component (α) at 25° C. is preferably within a range from 1 to 50,000 mPa·s, and more preferably from 10 to 10,000 mPa·s. In those cases where the component (α) is a solid at room temperature, and is heated and melted to generate a liquid state before mixing with the other components, the heating temperature is preferably set so as to achieve a viscosity for the liquid component (α) within a range from 1 to 50,000 mPa·s, and more preferably from 10 to 10,000 mPa·s. In those cases where the component (α) is converted to a water-based emulsion or an organic solvent solution before mixing with the other components, the viscosity at 25° C. of the water-based emulsion or organic solvent solution is preferably adjusted to a value within a range from 1 to 50,000 mPa·s, and more preferably from 10 to 10,000 mPa·s.

If the condensation-curable silicone composition is a liquid at room temperature, then from the viewpoints of the molding and handling properties of the composition, the viscosity of the composition at room temperature is preferably within a range from 10 to 200,000 mPa·s, and even more preferably from 50 to 100,000 mPa·s. If the composition is a solid at room temperature, then from the viewpoints of the molding and handling properties of the composition, the viscosity of the liquid state obtained by heating and melting the composition is preferably set to a value within a range from 10 to 200,000 mPa·s, and even more preferably from 50 to 100,000 mPa·s.

—Composition Curing

If the condensation-curable silicone composition is left to stand within an atmosphere that contains moisture (for example, a humidity within a range from 25 to 90% RH, and preferably from 50 to 85% RH), the composition cures under the action of the moisture in the atmosphere. Heating at a temperature of 300° C. or lower (for example, a temperature from 40 to 300° C.) may be used to accelerate the curing of the composition. Furthermore, secondary curing may also be conducted if required, and the temperature conditions during such secondary curing are preferably at least 120° C., and more preferably within a range from 150 to 250° C. The secondary curing time is preferably within a range from 10 minutes to 48 hours, and is even more preferably from 30 minutes to 24 hours.

In those cases where the silicone composition comprises the component (α) and the component (β), but contains no condensation catalyst of the component (γ), the composition is subjected to a heat treatment. This heat treatment causes the condensation reaction within the composition to proceed, thereby curing the composition. Because the curing rate varies depending on the quantity of the silicone resin within the composition, the temperature conditions for curing may be selected appropriately in accordance with this quantity of the silicone resin, but the heating temperature is preferably within a range from 100 to 300° C., and even more preferably from 150 to 250° C. The curing time is typically within a range from 1 minute to 3 hours, and is preferably from 3 minutes to 2 hours. Furthermore, secondary curing may be conducted if required, and the conditions for such secondary curing are as described above.

—Mineralization of the Silicone Cured Product—

The cured product of the curable silicone composition is subjected to a heat treatment in a non-oxidizing atmosphere, thereby causing mineralization of the silicone.

This heat treatment is conducted under a non-oxidizing atmosphere, and preferably under an inert gas atmosphere. Examples of the inert gas include nitrogen gas, argon gas and helium gas, although in order to achieve a higher purity silicon carbide, argon gas is particularly desirable.

The heat treatment is conducted at a temperature exceeding 1,500° C. but not more than 2,600° C. This heating temperature is preferably 1,600° C. or higher. Furthermore, the heating temperature is preferably not more than 2,100° C., and is even more preferably 2,000° C. or lower. In other words, the heating temperature is preferably within a range from 1,600 to 2,100° C., and more preferably from 1,600 to 2,000° C. This heat treatment firstly causes cleavage of carbon-hydrogen bonds within the silicone and elimination of hydrogen from within the material at temperatures within a range from 400 to 1,500° C., although the mineralization proceeds without elimination of silicon and carbon. Within this temperature range, large quantities of oxygen remain within the inorganic ceramic material produced by the mineralization, indicating that the temperature is insufficient for producing silicon carbide. When the temperature exceeds 1,500° C., elimination of carbon monoxide begins to occur, eventually leading to the formation of silicon carbide. If the temperature exceeds 2,600° C., then the level of silicon carbide sublimation becomes overly severe.

Furthermore, the end point of the heat treatment can be specified, for example, as the point where heating the product at 1,800° C. for one hour causes a mass reduction of less than 1% by mass.

Heat treatment of a silicone cured product obtained by first molding the curable silicone composition into a desired shape of desired dimensions and subsequently curing the composition may be conducted either following removal of the silicone cured product from the molding die in the case of a metal mold, or without removing the cured product in the case of a sand mold.

EXAMPLES

A more detailed description of the present invention is presented below based on a series of examples, although the present invention is in no way limited by the examples described below. In the examples, molecular weight values are weight average molecular weight values measured using GPC and referenced against polystyrene standards. Further, the average elemental ratio between the compositional elements within a product produced by heat treatment is simply referred to as the "elemental ratio", and is represented by an elemental composition formula: $SiC_g$ (wherein, g is a number of 0 or greater). This elemental composition formula indicates that the average elemental ratio between silicon and carbon within the product is 1:g. Moreover, "Me" represents a methyl group.

Example 1

The components (A) and (B) described below were used as silicone components, and the component (C) described below was used as a platinum group metal-based catalyst. The quantity of each component is also shown below.
(A) 55 parts by mass of a diorganopolysiloxane containing alkenyl groups bonded to silicon atoms, represented by an average composition formula (5) shown below.

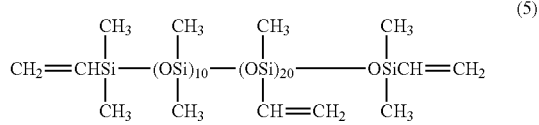

(B) 45 parts by mass of a diorganopolysiloxane containing hydrogen atoms bonded to silicon atoms, represented by an average composition formula (6) shown below (wherein, the quantity of SiH groups within the component (B) per 1.0 mols of silicon atom-bonded alkenyl groups within the component (A) is 1.0 mols).

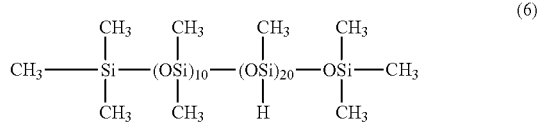

(wherein, the molar ratio of SiH groups relative to all the silicon atoms within the molecule is 0.625).
(C) a toluene solution of a platinum-divinyltetramethyldisiloxane complex (platinum element content: 0.5% by mass), in a quantity equivalent to 50 ppm of the platinum element relative to the mass of the component (A).

The above components (A) and (B) were placed in a planetary mixer (a registered trademark for a mixing device manufactured by Inoue Manufacturing Co., Ltd.), and were stirred for one hour at room temperature. Subsequently, the component (C) was added to the planetary mixer and stirring was continued for a further 30 minutes at room temperature, thus yielding a curable silicone composition with a viscosity at room temperature of 50 mPa·s. This curable silicone composition was cured by heating at 80° C. for one hour.

The thus obtained silicone cured product was placed in a vessel formed of carbon that was subsequently placed inside an atmosphere furnace, and under an atmosphere of argon gas, the temperature was raised to 1,800° C. over an 18-hour period at a rate of temperature increase of 100° C./hour. The temperature was then held at 1,800° C. for two hours, and then cooled to room temperature, yielding a yellow-green colored solid. When this yellow-green solid was subjected to a carbon analysis using a CS-444LS analyzer (a product name, manufactured by LECO Corporation), the carbon mass ratio was 30.3% by mass. Further, when the yellow-green solid was subjected to an oxygen analysis using a TC436 analyzer (a product name, manufactured by LECO Corporation), the oxygen mass ratio was not more than 0.2% by mass. Measurement of the elemental ratio for the yellow-green solid by EDX analysis (Energy Dispersive X-ray analysis) using a FE-SEM (Field Emission Scanning Electron Microscope) yielded a result of $SiC_{1.02}$. Moreover, measurement of the yellow-green solid using an X-ray diffraction method yielded the X-ray diffraction spectrum shown in FIG. 1(a). Comparison of the peak data for this spectrum (FIG. 1(b)) with the peak data for the X-ray diffraction spectrum of β-silicon carbide crystals (FIG. 1(c)) revealed a good match for the two sets of data, confirming that the yellow-green solid described above was composed of β-silicon carbide crystals.

Example 2

100 parts by mass of a silicone resin containing only $MeSiO_{3/2}$ units as the siloxane units and also containing 5% by mass of hydroxyl groups (molecular weight: 1,000, average composition formula: $Me(OH)_{0.2}SiO_{1.3}$, softening point: 65° C.) was placed in an aluminum Petri dish and cured by heating at 200° C. for one hour. The resulting silicone cured product was subjected to a heat treatment in the same manner as Example 1, yielding a yellow-green solid. Analysis of this yellow-green solid in the same manner as that described in Example 1 revealed a carbon mass ratio of 30.4% by mass, an oxygen mass ratio of not more than 0.2% by mass, and an elemental ratio of $SiC_{1.02}$.

Example 3

The components (A) to (C) used in Example 1 and a component (D) described below as a silicon carbide powder were used in the respective quantities listed below.
(A) 55 parts by mass of the diorganopolysiloxane containing alkenyl groups bonded to silicon atoms and represented by the average composition formula (5) shown above.
(B) 45 parts by mass of the diorganopolysiloxane containing hydrogen atoms bonded to silicon atoms and represented by the average composition formula (6) shown above.
(C) a toluene solution of a platinum-divinyltetramethyldisiloxane complex (platinum element content: 0.5% by mass), in a quantity equivalent to 0.15% by mass relative to the combined mass of the component (A) and the component (B).
(D) 327 parts by mass of a silicon carbide powder (volume average particle size: 10 μm) obtained by pulverizing the yellow-green solid of Example 1 using a ball mill (this quantity is equivalent to the quantity required to ensure that the silicon carbide powder represents 50% by volume of the entire silicone composition at room temperature).

The above components (A), (B) and (D) were placed in a planetary mixer (a registered trademark for a mixing device manufactured by Inoue Manufacturing Co., Ltd.), and were stirred for one hour at room temperature. Subsequently, the component (C) was added to the planetary mixer and stirring was continued for a further 30 minutes at room temperature, thus yielding a curable silicone composition with a viscosity at room temperature of 3,000 mPa·s. Subsequently, 75 g of this curable silicone composition was poured into a screen mask of thickness 4 mm having an opening of 130 mm×190 mm. The composition was then heated in the air at 125° C. for one hour, thus forming a silicone cured product. The silicone cured product was removed from the screen mask and then subjected to a heat treatment in the same manner as Example 1, yielding a yellow-green solid (dimensions: 130 mm×190 mm×4 mm). Analysis of this yellow-green solid in the same manner as that described in Example 1 revealed a carbon mass ratio of 30.3% by mass, an oxygen mass ratio of not more than 0.2% by mass, and an elemental ratio of $SiC_{1.02}$.

The invention claimed is:

1. A method of producing silicon carbide, comprising curing a condensation-curable silicone composition to produce a cured product and then heating the cured product of a curable silicone composition in a non-oxidizing atmosphere at a temperature exceeding 1,500° C. but not more than 2,600° C., wherein prior to the step of heating the cured product, the curable silicone composition is molded into a desired shape of desired dimensions and then cured to obtain the cured product, so that the silicon carbide is produced in the desired shape of desired dimensions after heating said cured product in the non-oxidizing atmosphere at said temperature exceeding 1,500° C. but not more than 2,600° C., wherein the curable silicone composition is a condensation-curable silicone composition comprising:

(α) a silicone resin represented by an average composition formula (3) shown below:

$$R3mR4n(OR5)p(OH)qSiO(4-m-n-p-q)/2$$

wherein, each R3 represents, independently, a hydrogen atom or a group methyl, ethyl or vinyl group,
R4 represents a phenyl group,
R5 represents a monovalent hydrocarbon group of 1 to 4 carbon atoms,
m represents a number that satisfies: $0.1 \leq m \leq 2$,
n is 0,
p represents a number that satisfies: $0 \leq p \leq 1.5$, and
q represents a number that satisfies: $0.2 \leq q \leq 0.35$,
provided that a value of m+n+p+q satisfies: $0.1 \leq m+n+p+q \leq 2.6$, (β) optionally, a hydrolysable silane or a partial hydrolysis-condensation product thereof or a combination thereof, and (γ) optionally, a condensation reaction catalyst.

2. The method of producing silicon carbide according to claim 1, wherein the curable silicone composition further comprises a silicon carbide powder.

3. The method of producing silicon carbide according to claim 1, wherein $R^3$ in the composition formula (3) is a methyl group.

4. The method of producing silicon carbide according to claim 1, wherein $R^3$ in the composition formula (3) is a methyl group.

5. The method of producing silicon carbide according to claim 1, wherein q in the composition formula (3) is 0.2.

* * * * *

UNITED STATES PATENT AND TRADEMARK OFFICE
CERTIFICATE OF CORRECTION

PATENT NO. : 8,617,505 B2
APPLICATION NO. : 13/624549
DATED : December 31, 2013
INVENTOR(S) : Hidehiko Tanaka et al.

It is certified that error appears in the above-identified patent and that said Letters Patent is hereby corrected as shown below:

ON THE TITLE PAGE:

Item (73), Assignee, change:

"(73) Assignee: National Institute for Materials Science, Tokyo (JP)"

to:

--(73) Assignees: National Institute for Materials Science, Tsukuba-shi (JP);
Shin-Etsu Chemical Co., Ltd., Tokyo (JP)--.

Signed and Sealed this
Second Day of December, 2014

Michelle K. Lee
*Deputy Director of the United States Patent and Trademark Office*